United States Patent
Bertiger et al.

(10) Patent No.: US 11,949,701 B2
(45) Date of Patent: Apr. 2, 2024

(54) NETWORK ACCESS ANOMALY DETECTION VIA GRAPH EMBEDDING

(71) Applicant: Microsoft Technology Licensing, LLC, Redmond, WA (US)

(72) Inventors: Anna Swanson Bertiger, Seattle, WA (US); Alexander Donald Modell, Chichester (GB); Jonathan Karl Larson, Bremerton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 377 days.

(21) Appl. No.: 17/492,439

(22) Filed: Oct. 1, 2021

(65) Prior Publication Data

US 2023/0053182 A1 Feb. 16, 2023

Related U.S. Application Data

(60) Provisional application No. 63/229,343, filed on Aug. 4, 2021.

(51) Int. Cl.
 G06F 15/16 (2006.01)
 G06F 9/54 (2006.01)
 H04L 9/40 (2022.01)
 H04L 29/06 (2006.01)

(52) U.S. Cl.
 CPC .......... *H04L 63/1425* (2013.01); *H04L 63/10* (2013.01)

(58) Field of Classification Search
 CPC .. H04L 63/1425; H04L 63/10; H04L 63/1416
 USPC ...................................................... 726/23
 See application file for complete search history.

(56) References Cited

U.S. PATENT DOCUMENTS

| 8,260,914 | B1 | 9/2012 | Ranjan |
| 9,038,180 | B2 | 5/2015 | Neil |
| 9,064,210 | B1 * | 6/2015 | Hart ...................... G06F 21/552 |
| 9,171,158 | B2 * | 10/2015 | Akoglu ................. G06F 21/566 |
| 9,306,962 | B1 * | 4/2016 | Pinto ................... H04L 63/1416 |

(Continued)

FOREIGN PATENT DOCUMENTS

| EP | 3110104 A1 | 12/2016 |
| EP | 3110304 A1 | 1/2017 |
| WO | 2020191001 A1 | 9/2020 |

OTHER PUBLICATIONS

"Notice of Allowance Issued in U.S. Appl. No. 16/917,318", dated Sep. 15, 2022, 7 Pages.

(Continued)

*Primary Examiner* — Hamza N Algibhah
(74) *Attorney, Agent, or Firm* — Schwegman Lundberg & Woessner, P.A.

(57) ABSTRACT

Disclosed is a scalable, graph-based approach to detecting anomalous accesses to resources in a computer network. Access events are represented as edges between resource nodes and accessing nodes (e.g., corresponding to users) in a bipartite graph, from which vector representations of the nodes that reflect the connections can be computed by graph embedding. For an access event of interest, an anomaly score may be computed based on dissimilarities, in terms of their embedding distances, between the associated accessing node and other accessing nodes that have accessed the same resource, and/or between the associated resource node and other resource nodes that have been accessed by the same accessing node.

20 Claims, 7 Drawing Sheets

(56) References Cited

U.S. PATENT DOCUMENTS

| | | | |
|---|---|---|---|
| 9,374,380 B2 | 6/2016 | Neil et al. | |
| 9,444,836 B2 | 9/2016 | Wright et al. | |
| 9,659,085 B2* | 5/2017 | Wang | G06F 16/335 |
| 9,699,206 B2 | 7/2017 | Neil | |
| 9,800,605 B2 | 10/2017 | Baikalov et al. | |
| 9,825,979 B2 | 11/2017 | Neil et al. | |
| 10,015,175 B2 | 7/2018 | Kent et al. | |
| 10,015,183 B1 | 7/2018 | Neil | |
| 10,122,741 B2 | 11/2018 | Neil et al. | |
| 10,192,058 B1 | 1/2019 | Jalil et al. | |
| 10,356,107 B1 | 7/2019 | Kent et al. | |
| 10,530,799 B1 | 1/2020 | Neil et al. | |
| 10,630,704 B1 | 4/2020 | Ghosh et al. | |
| 10,686,816 B1* | 6/2020 | Shintre | H04L 63/1425 |
| 10,958,667 B1 | 3/2021 | Maida et al. | |
| 11,023,612 B2* | 6/2021 | Koster | H04L 67/10 |
| 11,165,803 B2* | 11/2021 | Brown | H04L 63/1441 |
| 11,539,749 B2* | 12/2022 | Canzanese, Jr. | H04L 63/20 |
| 11,757,918 B2* | 9/2023 | Clifford | H04L 63/1433 |
| 2012/0278021 A1* | 11/2012 | Lin | G06F 17/10 |
| | | | 702/85 |
| 2012/0304007 A1* | 11/2012 | Hanks | G05B 23/0229 |
| | | | 714/E11.029 |
| 2014/0165195 A1* | 6/2014 | Brdiczka | G06F 21/552 |
| | | | 726/23 |
| 2015/0047026 A1 | 2/2015 | Neil et al. | |
| 2015/0074806 A1* | 3/2015 | Roundy | H04L 63/1425 |
| | | | 726/23 |
| 2015/0106324 A1* | 4/2015 | Puri | G06F 11/0706 |
| | | | 706/52 |
| 2015/0242637 A1 | 8/2015 | Tonn et al. | |
| 2016/0088006 A1* | 3/2016 | Gupta | H04L 41/149 |
| | | | 706/12 |
| 2016/0217378 A1* | 7/2016 | Bellala | G05B 23/024 |
| 2017/0063908 A1* | 3/2017 | Muddu | G06N 20/20 |
| 2017/0063909 A1* | 3/2017 | Muddu | H04L 63/20 |
| 2017/0228277 A1 | 8/2017 | Cheng et al. | |
| 2017/0279818 A1 | 9/2017 | Milazzo et al. | |
| 2018/0013777 A1 | 1/2018 | Divalentin et al. | |
| 2018/0027416 A1 | 1/2018 | Bickford et al. | |
| 2018/0248904 A1* | 8/2018 | Villella | G06N 3/047 |
| 2018/0278641 A1 | 9/2018 | Neil | |
| 2018/0302423 A1* | 10/2018 | Muddu | G06F 40/134 |
| 2018/0316704 A1 | 11/2018 | Joseph Durairaj et al. | |
| 2018/0322456 A1 | 11/2018 | Vesely et al. | |
| 2018/0336437 A1 | 11/2018 | Cheng et al. | |
| 2018/0337935 A1* | 11/2018 | Marwah | H04L 63/1425 |
| 2018/0343272 A1 | 11/2018 | Khalil et al. | |
| 2018/0351971 A1 | 12/2018 | Chen et al. | |
| 2018/0375883 A1* | 12/2018 | Bhatkar | H04L 67/306 |
| 2019/0132344 A1 | 5/2019 | Lem et al. | |
| 2019/0182281 A1 | 6/2019 | Neil et al. | |
| 2019/0364060 A1 | 11/2019 | Muddu et al. | |
| 2020/0004888 A1* | 1/2020 | Rossi | G06F 16/9032 |
| 2020/0036701 A1* | 1/2020 | Mathew | G06F 17/16 |
| 2020/0226460 A1* | 7/2020 | Bruss | G06F 16/9024 |
| 2020/0236125 A1* | 7/2020 | Wright | H04L 63/1425 |
| 2020/0274894 A1* | 8/2020 | Argoeti | H04L 63/1433 |
| 2020/0296124 A1 | 9/2020 | Pratt et al. | |
| 2020/0349586 A1 | 11/2020 | Deng et al. | |
| 2020/0372106 A1 | 11/2020 | Liu et al. | |
| 2020/0412755 A1 | 12/2020 | Jing et al. | |
| 2021/0049442 A1 | 2/2021 | Menon et al. | |
| 2021/0075805 A1* | 3/2021 | Cavallari | G06N 3/088 |
| 2021/0103768 A1 | 4/2021 | Niculescu-mizil et al. | |
| 2021/0112080 A1 | 4/2021 | Chen | |
| 2021/0194907 A1 | 6/2021 | Bertiger et al. | |
| 2021/0209229 A1* | 7/2021 | Wu | G06F 16/285 |
| 2021/0406365 A1 | 12/2021 | Neil et al. | |
| 2021/0406917 A1* | 12/2021 | Erickson | G06N 3/084 |
| 2022/0086179 A1* | 3/2022 | Levin | H04W 12/63 |
| 2022/0377097 A1 | 11/2022 | Bertiger et al. | |
| 2023/0129144 A1 | 4/2023 | Neil et al. | |
| 2023/0326012 A1* | 10/2023 | Takla | G06V 10/25 |
| | | | 382/110 |

OTHER PUBLICATIONS

Kiouche, et al., "A Simple Graph Embedding for Anomaly Detection in a Stream of Heterogeneous Labeled Graphs", In Journal of Pattern Recognition, vol. 112, Apr. 1, 2021, 15 Pages.

"International Search Report & Written Opinion Issued in PCT Application No. PCT/US2022/037554", dated Oct. 21, 2022, 16 Pages.

Wei, et al., "AGE: Authentication Graph Embedding for Detecting Anomalous Login Activities", In Proceedings of International Conference on Information and Communications Security, Dec. 15, 2019, pp. 341-356.

"Notice of Allowance Issued in U.S. Appl. No. 16/888,762", dated Apr. 8, 2022, 5 Pages.

"Non Final Office Action Issued in U.S. Appl. No. 16/917,318", dated Mar. 30, 2022, 10 Pages.

U.S. Appl. No. 16/888,762, filed May 31, 2020, Detecting Anomalous Network Activity.

"Non Final Office Action Issued in U.S. Appl. No. 17/869,437", dated Mar. 23, 2023, 12 Pages.

"Application as Filed in U.S. Appl. No. 17/109,416", filed Dec. 2, 2020, 67 Pages.

"Non Final Office Action Issued in U.S. Appl. No. 16/888,762", dated Sep. 7, 2021, 15 Pages.

Adams, et al., "Data Science for Cyber-Security", In Publication of World Scientific Publishing Europe Ltd, Sep. 26, 2018, 2 Pages.

Akoglu, et al., "Graph-Based Anomaly Detection and Description: A Survey", In Repository of arXiv:1404.4679v2, Apr. 28, 2014, pp. 1-68.

Athreya, et al., "Statistical Inference on Random Dot Product Graphs: a Survey", In the Journal of Machine Learning Research, vol. 18, Issue 1, May 2018, 92 Pages.

Benjamin, et al., "Generalized Autoregressive Moving Average Models", In Journal of the American Statistical Association, vol. 98, Issue 461, Mar. 2003, pp. 214-223.

Boden, et al., "Mining Coherent Subgraphs in Multi-Layer Graphs with Edge Labels", In Proceedings of the 18th ACM SIGKDD International Conference on Knowledge Discovery and Data Mining, Aug. 12, 2012, pp. 1258-1266.

Brockwell, et al., "Time Series: Theory and Methods", Published by Springer-Verlag, 1987, 5 Pages.

Brownlee, Jason, "A Gentle Introduction to SARIMA for Time Series Forecasting in Python", Retrieved from: https://machinelearningmastery.com/sarima-for-time-series-forecasting-in-python/, Aug. 17, 2018, 31 Pages.

Charlin, et al., "Dynamic Poisson Factorization", In Proceedings of the 9th ACM Conference on Recommender Systems, Sep. 16, 2015, pp. 155-162.

Chaudhary, et al., "Anomaly Detection Using Graph Neural Networks", In Proceedings of International Conference on Machine Learning, Big Data, Cloud and Parallel Computing (COMITCon), Feb. 14, 2019, pp. 346-350.

Cheema, et al., "Network Security Using Graph Theory", In International Journal of Innovation in Engineering and Technology, vol. 2, Issue 3, Jun. 2013, pp. 131-138.

Chickering, et al., "Selective Greedy Equivalence Search: Finding Optimal Bayesian Networks Using a Polynomial Number of Score Evaluations", In Proceedings of the Thirty-First Conference on Uncertainty in Artificial Intelligence (UAI), Jun. 2015, 16 Pages.

Clauset, et al., "Hierarchical Structure and the Prediction of Missing Links in Networks", In Journal of Nature, vol. 453, Issue 7191, May 1, 2008, pp. 98-101.

Deng, et al., "Graph Neural Network-Based Anomaly Detection in Multivariate Time Series", In Proceedings of the AAAI Conference on Artificial Intelligence, vol. 35, No. 5, Feb. 2, 2021, 9 Pages.

Dhillon, Inderjits. , "Co-Clustering Documents and Words Using Bipartite Spectral Graph Partitioning", In Proceedings of the Sev-

(56) References Cited

OTHER PUBLICATIONS enth ACM SIGKDD International Conference on Knowledge Discovery and Data Mining, Aug. 26, 2001, pp. 269-274.
Dong, et al., "Clustering on Multi-Layer Graphs via Subspace Analysis on Grassmann Manifolds", In Journal of IEEE Transactions on Signal Processing, vol. 62, Issue 4, Feb. 15, 2014, pp. 905-918.
Dryden, et al., "Statistical Shape Analysis: With Applications in R. Second Edition", Published by John Wiley & Sons, Sep. 6, 2016, 22 Pages.
Dunlavy, et al., "Temporal Link Prediction Using Matrix and Tensor Factorizations", In Journal of ACM Transactions on Knowledge Discovery from Data (TKDD), vol. 5, Issue 2, Article 10, Feb. 1, 2011, 27 Pages.
Durante, et al., "Bayesian Inference and Testing of Group Differences in Brain Networks", In Journal of Bayesian Analysis, vol. 13, Issue 1, 2018, pp. 29-58.
Durante, et al., "Nonparametric Bayes Dynamic Modelling of Relational Data", In Journal of Biometrika, vol. 101, Issue 4, Oct. 8, 2014, pp. 883-898.
Durante, et al., "Nonparametric Bayes Modeling of Populations of Networks", In Journal of the American Statistical Association, vol. 112, Issue 520, Jul. 6, 2017, pp. 1516-1530.
Gallagher, et al., "Spectral Clustering in the Weighted Stochastic Block Model", In Repository of arXiv:1910.05534v1, Oct. 12, 2019, 11 Pages.
Ginestet, et al., "Hypothesis Testing for Network Data in Functional Neuroimaging", In Journal of Annals of Applied Statistics, vol. 11, Issue 2, Jun. 2017, pp. 725-750.
Gower, J.C., "Generalized Procrustes Analysis", In Journal of Psychometrika, vol. 40, Issue 1, Mar. 1975, pp. 33-51.
Goyal, et al., "DynGEM: Deep Embedding Method for Dynamic Graphs", In Repository of arXiv:1805.11273v1, May 29, 2018, 8 Pages.
Gu, et al., "Statistical Analysis of Nearest Neighbor Methods for Anomaly Detection", In Proceedings of 33rd Conference on Neural Information Processing Systems (NeurIPS), Dec. 8, 2019, 11 Pages.
Hasan, et al., "Towards Optimal Cyber Defense Remediation in Energy Delivery Systems", In Proceedings of Global Communications Conference, Dec. 9, 2019, 7 Pages.
Hewapathirana, Isuruu. , "Change Detection in Dynamic Attributed Networks", In Repository of arXiv:2001.04734v1, Jan. 14, 2020, 39 Pages.
Hoff, et al., "Latent Space Approaches to Social Network Analysis", In Journal of the American Statistical Association, vol. 97, Issue 460, Dec. 2002, pp. 1090-1098.
Holland, et al., "Stochastic Blockmodels: First Steps", In Journal of Social Networks, vol. 5, Issue 2, Jun. 1, 1983, pp. 109-137.
Hosseini, et al., "Recurrent Poisson Factorization for Temporal Recommendation", In Journal of IEEE Transactions on Knowledge and Data Engineering, vol. 32, Issue 1, Jan. 2020, pp. 121-134.
Hyndman, et al., "Automatic Time Series for Forecasting: The Forecast Package for R", In Journal of Statistical Software, vol. 27, Issue 3, Jul. 29, 2008, 22 Pages.
Idé, et al., "Eigenspace-Based Anomaly Detection in Computer Systems", In Proceedings of the Tenth ACM SIGKDD International Conference on Knowledge Discovery and Data Mining, Aug. 22, 2004, pp. 440-449.
Ishiguro, "Dynamic Infinite Relational Model for Time-Varying Relational Data Analysis", In Proceedings of 24th Annual Conference on Neural Information Processing Systems, Dec. 6, 2010, 9 Pages.
Jeske, et al., "Statistical Methods for Network Surveillance", In Journal of Applied Stochastic Models in Business and Industry, vol. 34, Issue 4, Jul. 2018, 21 Pages.
Juszczyszyn, et al., "Motif-Based Attack Detection in Network Communication Graphs", In Proceedings of IFIP International Conference on Communications and Multimedia Security, Oct. 19, 2019, 8 Pages.

Kauppi, et al., "Predicting U.S. Recessions with Dynamic Binary Response Models", In Journal of the Review of Economics and Statistics, vol. 90, Issue 4, Nov. 2008, pp. 777-791.
Kim, et al., "Graph-aware Modeling of Brain Connectivity Networks", In Repository of arXiv:1903.02129v2, Apr. 30, 2019, 31 Pages.
Kintzel, Ulric, "Procrustes Problems in Finite Dimensional Indefinite Scalar Product Spaces", In Journal of Linear Algebra and its Applications, vol. 402, Jun. 1, 2005, 28 Pages.
Krivitsky, et al., "A Separable Model for Dynamic Networks", In Journal of the Royal Statistical Society. Series B, Statistical Methodology, vol. 76, Issue 1, Jan. 1, 2014, 21 Pages.
Levin, et al., "A Central Limit Theorem for an Omnibus Embedding of Multiple Random Graphs and Implications for Multiscale Network Inference", In Repository of arXiv:1705.09355v5, Jun. 26, 2019, 37 Pages.
Liben-Nowell, et al., "The Link-Prediction Problem for Social Networks", In Journal of the American Society for Information Science and Technology, vol. 58, Issue 7, May 2007, 23 Pages.
Liu, et al., "Fraud Detection Using Graph Topology and Temporal Spikes", In Proceedings of the 13th International Workshop on Mining and Learning with Graphs (MLG), Aug. 14, 2017, 8 Pages.
Lu, et al., "Link Prediction in Complex Networks: A Survey", In Journal of Physica A: Statistical Mechanics and its Applications, vol. 390, Issue 6, Mar. 15, 2011, pp. 1150-1170.
Macdonald, et al., "Hidden Markov and Other Models for Discrete-Valued Time Series", Published by Chapman and Hall, 1997, 5 Pages.
Menon, et al., "Link Prediction via Matrix Factorization", In Proceedings of Joint European Conference on Machine Learning and Knowledge Discovery in Databases, Sep. 5, 2011, pp. 437-452.
Metelli, et al., "On Bayesian New Edge Prediction and Anomaly Detection in Computer Networks", In Journal of Annals of Applied Statistics, vol. 13, Issue 4, Dec. 2019, 28 Pages.
Mookiah, et al., "Detecting Suspicious Behavior Using a Graph-Based Approach", In Proceedings of IEEE Conference on Visual Analytics Science and Technology (VAST), Nov. 9, 2014, pp. 357-358.
Mussmann, et al., "Graph Search Algorithms", Retrieved From: https://web.archive.org/web/20190612005845/https://cs.stanford.edu/people/abisee/gs.pdf, Jun. 12, 2019, 48 Pages.
Young, et al., "Random Dot Product Graph Models for Social Networks", In Proceedings of International Workshop on Algorithms and Models for the Web-Graph, Dec. 11, 2007, pp. 138-149.
Neil, et al., "Scan Statistics for the Online Detection of Locally Anomalous Subgraphs", In Journal of Technometrics, vol. 55, Issue 4, Nov. 1, 2013, pp. 403-414.
Nielsen, et al., "The Multiple Random Dot Product Graph Model", In Repository of arXiv:1811.12172v1, Nov. 29, 2018, 22 Pages.
Passino, et al., "Latent Factor Representations of Dynamic Networks with Applications in Cyber-Security", In Thesis of Imperial College London, Oct. 2020, 206 Pages.
Passino, et al., "Link Prediction in Dynamic Networks Using Random Dot Product Graphs", In Journal of Data Mining and Knowledge Discovery, vol. 35, No. 5, Aug. 5, 2021, pp. 2168-2199.
"International Search Report and the Written Opinion Issued in PCT Application No. PCT/US20/061989", dated Jan. 20, 2021, 12 Pages.
"International Search Report & Written Opinion issued in PCT Application No. PCT/US2021/033956", dated Aug. 18, 2021, 26 Pages.
Phillips, et al., "A Graph-Based System for Network-Vulnerability Analysis", In Proceedings of the Workshop on New Security Paradigms, Sep. 22, 1998, pp. 71-79.
Arroyo, et al., "Inference for Multiple Heterogeneous Networks with a Common Invariant Subspace", In Repository of arXiv:1906.10026v1, Jun. 24, 2019, 40 Pages.
Relion, et al., "Network Classification with Applications to Brain Connectomics", In Repository of arXiv:1701.08140v1, Jan. 27, 2017, 28 Pages.
Rohe, et al., "Co-Clustering Directed Graphs to Discover Asymmetries and Directional Communities", In Proceedings of the National Academy of Sciences, vol. 113, No. 45, Nov. 8, 2016, pp. 12679-12684.

(56) References Cited

OTHER PUBLICATIONS

Rubin-Delanchy, et al., "A Statistical Interpretation of Spectral Embedding: The Generalised Random Dot Product Graph", In Repository of arXiv:1709.05506v1, Sep. 16, 2017, 10 Pages.

Sarkar, et al., "Dynamic Social Network Analysis using Latent Space Models", In Proceedings of Neural Information Processing Systems, Dec. 5, 2005, 8 Pages.

Schein, et al., "Bayesian Poisson Tensor Factorization for Inferring Multilateral Relations from Sparse Dyadic Event Counts", In Proceedings of the 21th ACM SIGKDD International Conference on Knowledge Discovery and Data Mining, Aug. 11, 2015, pp. 1045-1054.

Schein, et al., "Bayesian Poisson Tucker Decomposition for Learning the Structure of International Relations", In Proceedings of the 33nd International Conference on Machine Learning, Jun. 19, 2016, 10 Pages.

Scheinerman, et al., "Modeling Graphs Using Dot Product Representations", In Journal of Computational Statistics, vol. 25, Issue 1, Jun. 10, 2009, 16 Pages.

Schonemann, Peterh., "A Generalized Solution of the Orthogonal Procrustes Problem", In Journal of Psychometrika, vol. 31, Issue 1, Mar. 1966, 10 Pages.

Sewell, et al., "Latent Space Models for Dynamic Networks", In Journal of the American Statistical Association, vol. 110, Issue 512, Dec. 2015, pp. 1646-1657.

Sharan, et al., "Temporal-Relational Classifiers for Prediction in Evolving Domains", In Proceedings of Eighth International Conference on Data Mining, Dec. 15, 2008, pp. 540-549.

Shiga, et al., "A Variational Bayesian Framework for Clustering with Multiple Graphs", In Journal of IEEE Transactions on Knowledge and Data Engineering, vol. 24, Issue 4, Apr. 2012, pp. 577-589.

Sussman, et al., "A Consistent Adjacency Spectral Embedding for Stochastic Blockmodel Graphs", In Repository of arXiv:1108.2228v3, Apr. 27, 2012, 21 Pages.

Tang, et al., "Clustering with Multiple Graphs", In Proceedings of Ninth IEEE International Conference on Data Mining, Dec. 6, 2009, pp. 1016-1021.

Tang, et al., "Connectome Smoothing via Low-Rank Approximations", In Journal of IEEE Transactions on Medical Imaging, vol. 38, Issue 6, Jun. 2019, pp. 1446-1456.

Turcotte, et al., "Chapter 1: Unified Host and Network Data Set", In Book of Data Science for Cyber-Security, 2018, 22 Pages.

Wang, et al., "Joint Embedding of Graphs", In Journal of IEEE Transactions on Pattern Analysis and Machine Intelligence, Oct. 31, 2019, 13 Pages.

Xing, et al., "A State-Space Mixed Membership Blockmodel for Dynamic Network Tomography", In Journal of Annals of Applied Statistics, vol. 4, Issue 2, Jun. 2010, pp. 535-566.

Xu, et al., "Dynamic Stochastic Blockmodels for Time-Evolving Social Networks", In IEEE Journal of Selected Topics in Signal Processing, vol. 8, Issue 4, Aug. 2014, pp. 552-562.

"Notice of Allowance Issued in U.S. Appl. No. 17/869,437", dated Sep. 6, 2023, 5 Pages.

* cited by examiner

NETWORK ACCESS ANOMALY DETECTION VIA GRAPH EMBEDDING

CROSS-REFERENCE TO RELATED APPLICATION

This application claims priority to and the benefit of U.S. Provisional Application No. 63/229,343, filed on Aug. 4, 2021, which is hereby incorporated herein by reference.

BACKGROUND

In the face of ever-increasing prevalence and sophistication of cyber attacks, the need to detect suspicious behavior within an organization has never been greater. Traditional security systems rely on detecting pre-defined signatures to identify known threats, but are increasingly evaded by the most sophisticated attackers. In particular, since their rule sets must be continually updated in response to known vulnerabilities, they are often unable to protect against previously unseen attacks. Anomaly-based intrusion detection provides a complementary approach that has the potential to discover unknown threats and so-called zero-day attacks. In contrast to signature-based methods, anomaly-based methods model the characteristics of "normal" behavior using historical data, and raise behavior that deviates significantly from this model for further inspection. Deploying anomaly-based models to cyber security in practice faces a number of challenges. Firstly, users often perform a widely varying range of behaviors, so any model should be flexible enough to not flag significant amounts of benign behavior as suspicious. Secondly, security systems typically process very large amounts of data at very high rates, and should therefore be simple enough to be computationally tractable at these scales.

BRIEF DESCRIPTION OF DRAWINGS

Various embodiments of an approach for anomaly detection based on graph embeddings are herein described with reference to the accompanying drawings, in which.

DESCRIPTION

Figure 1:
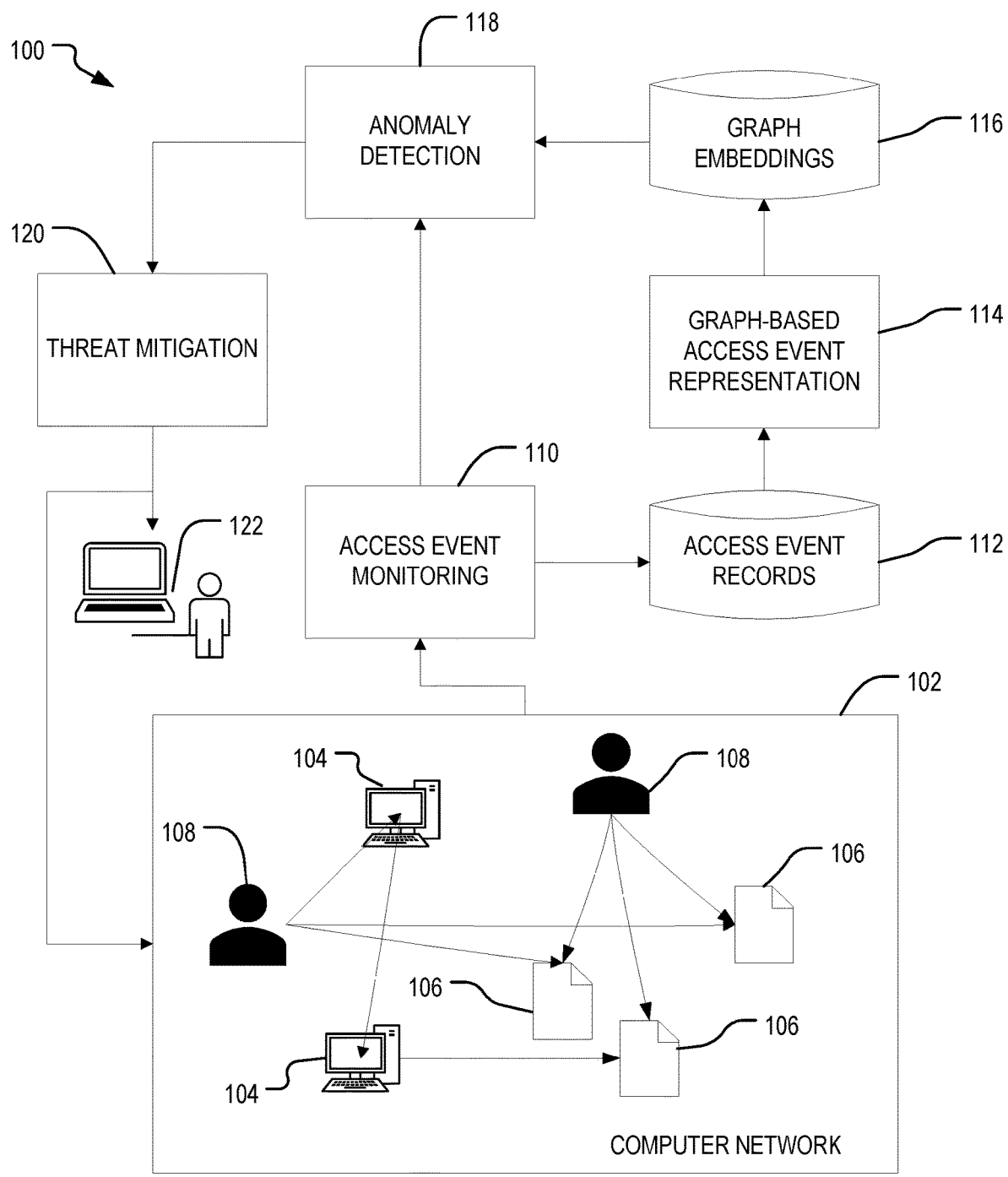
FIG. 1 is a block diagram of an example anomaly detection system for monitoring access events within a computer network for anomalies, in accordance with an embodiment.

Disclosed herein is an approach to detecting anomalies in a time series of interaction events between a set of resources and a set of entities accessing the resources, e.g., in a computer network. The interaction events each involve an access, or at least an attempted access, by one of the accessing entities (herein also "accessing nodes") to one of the resources (herein also "resource nodes"), and are therefore herein also referred to as "access events." The term "resources" as used herein can refer to both hardware resources (e.g., devices like computers, data storage devices, peripheral devices, sensors, etc.) and any kind of data or software (e.g., in the form of files or documents), such as, without limitation, web sites, text documents, images, video, audio files, multimedia files, computer programs, etc. The term "accessing node" is herein understood broadly to encompass human users as well as machines or programs that act as automated agents accessing resources (such as, e.g., client devices accessing resources on servers, or mobile devices accessing cloud services). In the following description, the disclosed approach is in various places illustrated, for specificity and ease of reference, with the example of users accessing resources; it is to be understood, however, that other types of accessing nodes can generally be substituted for the users.

Anomalies in access events can be indicative of security threats, such as, for example, a compromised user account or a user that presents an insider risk. Accordingly, the described systems and methods for monitoring accesses to resources for anomalies can help discover security threats, in some embodiments triggering some type of mitigating action (e.g., raising an alert to a network administrator or curtailing network access). In addition, the systems and method for anomaly monitoring and detection may be used to provide context to an investigation of already known threats by highlighting specific abnormal behaviors of an accessing node. For example, in the event of compromised user credentials, user behavior within the network may be monitored for malicious exploitation of the stolen credentials as distinct from ordinary use of the credentials by the authorized user.

Anomaly detection in accordance herewith is based on the notion that regular and benign resource utilization tends to be clustered around groups of accessing nodes collectively accessing generally the same sets of resource nodes, and conversely, that malicious activity, e.g., by a compromised user account, likely involves accesses to resource nodes for which there is no historical precedent. Accordingly, access events are evaluated, in accordance herewith, based on their similarity to prior access events, and flagged as suspicious if their dissimilarity from those other events exceeds a pre-defined threshold.

In the disclosed approach, access events in a network are represented as a bipartite graph in which accessing nodes (like users) and resource nodes are represented by two distinct types of nodes (or vertices) of the graph, and (actual and/or attempted) accesses of resource nodes by accessing nodes are each represented by a time-stamped edge between a respective pair of nodes of both types. Conventional anomaly detection approaches for graph data usually involve representing the nodes in a feature space, and as such rely heavily on feature engineering; in these approaches, the quality of the engineered features directly affects the effectiveness of anomaly detection. In the approach disclosed herein, by contrast, representations of the nodes are learned directly from the graph structure, using bipartite graph embedding techniques. "Graph embeddings" is the general name for a class of algorithms that learn vector representations of the network nodes which reflect the connection patterns of the nodes. Nodes with similar connection patterns are embedded close together, and those which are dissimilar are embedded far apart. Several algorithms that achieve such embeddings are known to those of ordinary skill in the art, and include, without limitation, techniques based on random walks (e.g., deepwalk, node2vec), deep learning, and matrix factorization. One particular approach, known as spectral embedding, employs the spectral decomposition of a matrix representation of the graph. There are many variants involving different matrix representations, regularization to improve performance, and degree-correction to remove the dependence of degree from the embeddings. These methods are well-understood from a statistical perspective, and tend to render the embeddings fast to compute. Bipartite graph embedding algorithms are adaptations of general graph embedding algorithms to bipartite graphs, and result in separate sets of graph embeddings for the two sets of nodes that allow similarity to be evaluated among nodes of the same type based on their connections to the nodes of the respective other type. Nodes of a given type that are similar in that they overlap in the nodes of the other type with which they are connected are embedded closer together than nodes that do not overlap, or overlap less, in the nodes of the other type with which they are connected.

The description that follows and the accompanying drawings further illustrate the use of bipartite graphs and associated graph embeddings in monitoring access to resource nodes in a network for anomalies, in accordance with various embodiments.

FIG. 1 is a block diagram of an example computing system 100 for monitoring access events within a computer network 102 for anomalies, in accordance with an embodiment. The computing system 100, herein also "anomaly detection system," may be implemented with software executed and data structures stored on one or more computing machines each including one or more (e.g., general-purpose) processors and associated volatile memory as well as one or more non-volatile data storage devices; an example computing machine is described in more detail below with reference to FIG. 9. Although depicted as outside the computer network 102, the computing machines executing the software components of anomaly detection system 100 may be integrated with and thus form part of the monitored computer network 102. The monitored computer network 102 itself likewise includes computing machines 104 (e.g., as described in FIG. 9) that are interconnected via wired or wireless network connections (e.g., Ethernet, Wi-Fi, optical fiber, etc.) to form, e.g., a local area network (LAN) or wide area network (WAN); such a network may serve, for instance, as the intranet of an organization. The computing machines 104 of the computing network 102 generally host computer programs (e.g., web services) and/or data (e.g., text documents, images and video, multimedia files, databases, etc.), all depicted as files 106. Users 108 may access these resources, that is, the computing machines 104 and the program or data files 106 executed and/or stored thereon. In addition to human users 108, the computing machines 104 and/or computer programs themselves may access other machines and programs or data. For example, a web service or other software application may have the ability to call other programs, e.g., via suitable application programming interfaces (APIs).

For purposes of the disclosed anomaly detection approach, the computing machines 104 and their components (e.g., processors or data storage devices) and associated peripheral hardware (e.g., input/output devices like printers and microphones, sensors, etc.) as well as the hosted computer-program and data files 106 are all examples of resource nodes of the computer network 102, and both users 108 and computing machines 104 or programs accessing those resources are examples of accessing nodes of (or associated with) the computer network 102. As will by understood by those of ordinary skill in the art, in some embodiments, the same computing machine 104 or computer program can serve, alternatingly or even simultaneously, both as a resource node and an accessing node.

The anomaly detection system 100 generally includes multiple distinct components such as computational blocks and data structures, which may be integrated in a single software application or utilize functionality from multiple intercommunicating programs. An access event monitoring component 110 monitors interactions between users 108 and the hardware, software, and/or data resources within the network 102, or between computing machines 104 and programs accessing other computing machines 104 and programs within the network, and writes time-stamped records of the observed access events to a database 112. Each access event record includes, in addition to the time-stamp, at least an identifier of the accessed resource node (e.g., a machine identifier like a MAC address, a program name or process identifier, a file name and location, etc.) and an identifier of the respective accessing node (e.g., a user account identifier or process identifier). The access event records may include records of both actual, successful accesses to resources and of access attempts that were thwarted by cyber security products associated with the computer network 102. Alternatively, the recorded access events may be limited to successful accesses. Various cyber security products that provide the functionality for implementing the access event monitoring component 110 exist in the market and may be utilized for this purpose in some embodiments.

The anomaly detection system 100 further includes a graph-based access event representation component 114 that reads the access event records from the database 112 to create and maintain a bipartite graph representing the accessing nodes and the resource nodes as two distinct sets of nodes and the access events as edges between pairs of nodes of both sets. To the extent the same machine or program serves in the roles of both accessing node and resource node, it is represented twice in the graph. The graph-based access event representation component 114 further processes the bipartite graph to compute graph embeddings for the accessing nodes, the resource nodes, or both, and typically stores the graph embeddings in a database 116 for future use.

In addition to storing records of access events, the access event monitoring component 110 also forwards access events of interest to the anomaly detection component 118 for determination whether or not each forwarded event is anomalous. In some embodiments, all access events, or alternatively all access events that are new in the sense that the associated accessing node has not previously accessed the associated resource node, are evaluated for anomalies. In other embodiments, only selected access events, such as accesses of resources marked as particularly sensitive or access events that raise suspicion of posing a security threat, are further analyzed. For example, a security breach, such as a theft of login or authentication credentials or installation of malware, may be discovered independently from the anomaly detection approach disclosed herein, and trigger heightened scrutiny of all subsequent access events that are associated with the breach in some way (e.g., by involving use of the stolen credentials or access to machines where the malware was installed).

Figure 5:
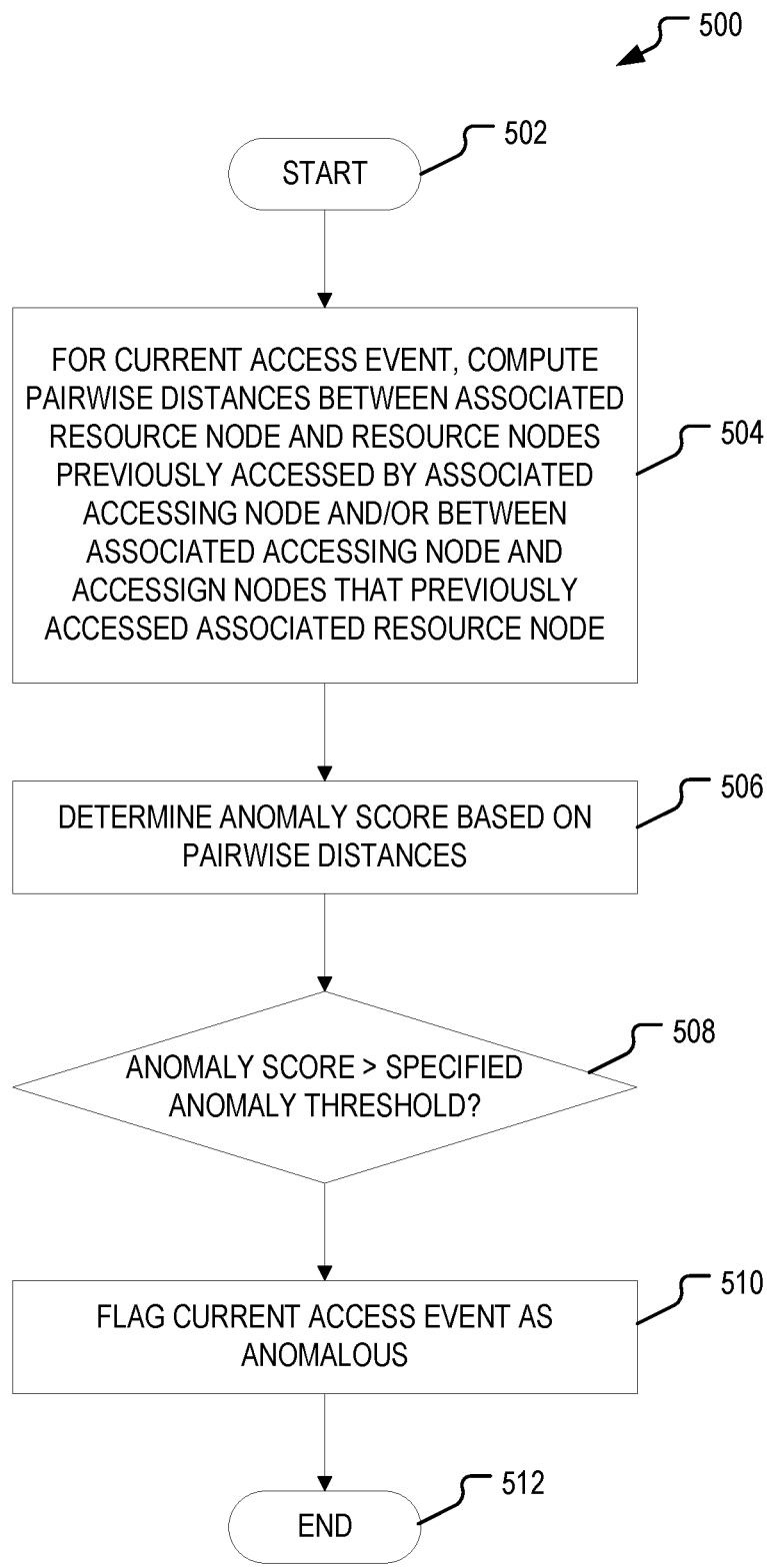
FIG. 5 is a flow chart of an example method of detecting anomalies in network access based on graph embeddings of resources and accessing nodes, in accordance with an embodiment.

For any access event of interest, herein also "current access event," the anomaly detection component 118 retrieves, from the database 116, the graph embeddings of the accessing and resource nodes of the current access event and the graph embeddings of accessing nodes that are linked to the resource node of the current access event and/or of resource nodes that are linked to the accessing node of the current access event in the bipartite graph, and computes an anomaly score from the embeddings, as detailed further with reference to FIG. 5. In the event that either of the accessing node and the resource node of the current access event was not previously represented in the bipartite graph, the graph embedding of such missing node may be induced from other graph embeddings, or the embeddings of all nodes may be recomputed after the bipartite graph has been updated to include the new node. Upon computation of the anomaly score, the anomaly detection component 118 compares the score against the pre-defined anomaly threshold to make a determination whether the current access event is anomalous. If the anomaly detection component 118 finds the current access event to be anomalous, it may then communicate this determination to a threat mitigation component 120 to thereby cause some type of threat-mitigating action.

The threat mitigation component 120 may, for instance, notify a system administrator or security analyst 122 of the anomaly, e.g., by sending a push notification via email, text, or some other messaging system, or by listing the access event in an anomaly or security-alert log that can be accessed by the system administrator or security analyst 122 via an administrator console or similar user interface. Alternatively or additionally, the threat mitigation component 120 may trigger an automated action, such as presenting a logon challenge (e.g., multi-factor authentication) to a user associated with the current access event prior to granting access to the requested resource, denying access to the resource outright, or even revoking the credentials of the user to prevent future accesses to the same or other resources. The severity of the mitigating action taken may depend, in some instances, on the computed anomaly score. Additional mitigating actions will occur to those of ordinary skill in the art. Like the access event monitoring component 110, the functionality of the threat mitigation component 120 may, in some embodiments, be provided by existing cyber security products.

Figure 2:
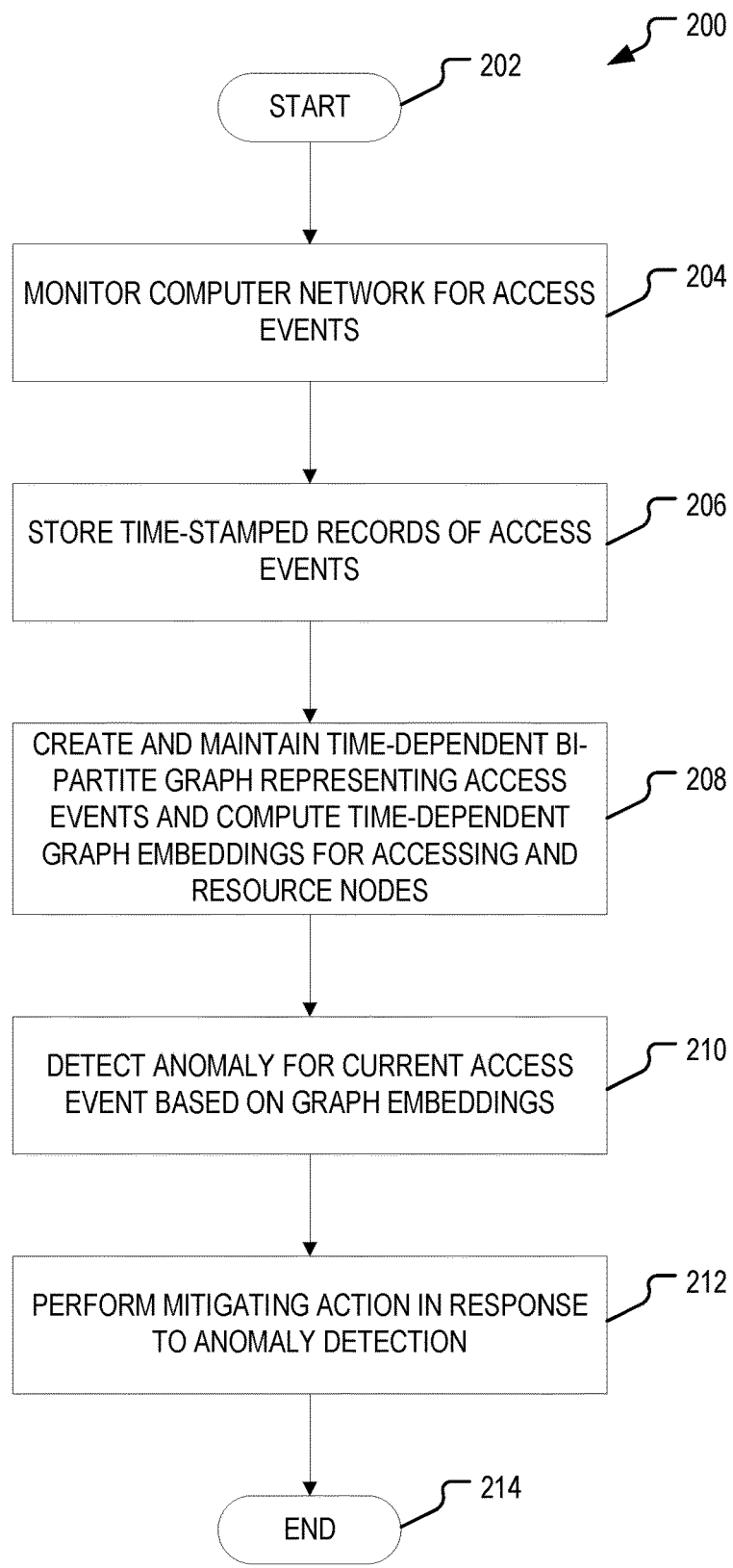
FIG. 2 is a flow chart of an example method of monitoring access events within a computer network for anomalies, in accordance with an embodiment.

FIG. 2 is a flow chart of an example method 200 of monitoring access events within a computer network 102 for anomalies, summarizing the operation of the anomaly detection system 100. Upon commencement of the method 200 (at 202), the computer network 102 is monitored for access events (act 204), typically continuously, and time-stamped records of the access events are stored (act 206). These access events are processed in two general stages, which may be referred to as training and scoring stages. In the training stage, the stored records are used to create a time-dependent bipartite graph, and after initial creation to maintain the graph via updates reflecting subsequent access events, and graph embeddings for accessing nodes and/or resource nodes are computed from the (most up-to-date) time-dependent graph (act 208). In the scoring stage, access events of interest (also "current access events") are evaluated based on the respective previously computed graph embeddings to detect anomalies (act 210), usually triggering performance of some mitigation action (in act 212), which concludes the method (at 214). Note that the training and scoring stages, while sequential from the perspective of a particular current access event, are, of course, generally concurrent from the viewpoint of monitoring the computer network for anomalous access events over time. That is, as access events are observed, they may be scored for purposes of anomaly detection, and used to update the bipartite graph and resulting embeddings, more or less in parallel.

In some embodiments, the bipartite graph is updated, and the graph embeddings are recomputed based on the updated graph, periodically, for instance, hourly, daily, weekly, monthly, or at some other regular time intervals. In other embodiments, the bipartite graph is updated at irregular intervals, e.g., responsive to some kind of update trigger event. For example, in applications where anomaly detection is not performed by default, but only once a security breach has already occurred (e.g., to provide further insight into the nature of the threat and the resulting damage), discovery of the security breach may constitute an update trigger event. As another example, in circumstances where embeddings tend to be stable over prolonged periods of time because access patterns do not change much, updates may be performed infrequently and triggered by some indicator that the graph has become "stale;" an example such indicator may be the increase of the anomaly detection rate above a certain trigger threshold. It is also possible, at least in principle, that the bipartite graphs and graph embeddings are updated continuously, responsive to each observed access event. Continuous updates ensure the highest anomaly detection accuracy, but come at significant computational cost; they may be feasible for smaller monitored computer networks 102, but can become prohibitively costly for very large computer networks 102.

Regardless of the update frequency, for a given point in time, the bipartite graph reflects, in some embodiments, all access events up the most recent update time, that is, any pair of an accessing node and a resource node in the graph is connected by an edge if and only if the accessing node has accessed the resource node at some point in the past (up to the most recent update time). In other embodiments, the time-dependent bipartite graph reflects access events in a rolling time window of specified duration, meaning that, for any given point in time, any pair of an accessing node and a resource node is connected by an edge if and only if the accessing node has accessed the resource within the specified time window preceding the most recent update time.

The determination whether a current event is anomalous may be made immediately upon detection of the access event ("in real time") based on the most recent update of the graph embeddings. In some embodiments, however, it may be beneficial to evaluate access events for anomalies in batches, e.g., to optimize the use of computational resources. In that case, it is possible that the graph embeddings at the time of batch processing are more current than some of the access events to be evaluated. For those older access events of interest, the anomaly scores may be determined based in part on access events in the future (relatively speaking), as they could be computed using embeddings of accessing nodes that accessed the resource node of interest, or of resource nodes that were accessed by the accessing node of interest, after the respective access events at issue occurred.

Figure 3:
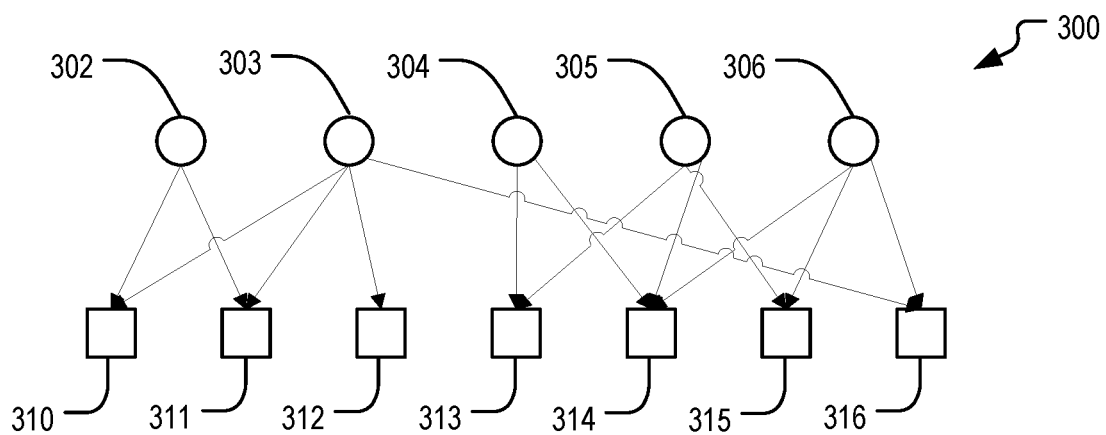
FIG. 3 is a schematic diagram of an example bipartite graph representing access events within a computer network, in accordance with an embodiment.

FIG. 3 is a schematic diagram of an example bipartite graph 300 representing access events within a computer network, in accordance with an embodiment. The bipartite graph 300 includes a set of accessing nodes (e.g., corresponding to users), depicted by circles and labeled 302, 303, 304, 305, 306, and a set of resource nodes, depicted by squares and labeled 310, 311, 312, 313, 314, 315, 316. An access event that involves an (actual or attempted) access by one of the accessing nodes 302, 303, 304, 305, 306 to one of the resource nodes 310, 311, 312, 313, 314, 315, 316 is represented by an edge between these two nodes. (To indicate the asymmetry of the interaction, the edges are depicted with arrows in FIG. 3). As can be seen, accessing nodes may overlap in the resources they access, and conversely, resource nodes may overlap in the accessing nodes by which they are accessed, which results in a natural grouping. To illustrate, in the depicted example, accessing nodes 302 and 303 have collectively accessed resource nodes 310, 311, 312, with nodes 310 and 311 accessed by both accessing nodes 302, 303, and accessing nodes 304, 305, 306 have collectively accessed resource nodes 313, 314, 315, 316, with nodes 313, 314, 315 each accessed by at least two of the accessing nodes. Contrast this, however, with the edge between accessing node 303 and resource node 316: this resource node 316 has not been accessed by any other node within the group (i.e., node 302) to which accessing node 303 belongs, nor has accessing node 303 accessed any other resources within the group to which resource node 316 belongs. As such, this edge, and the access event it represents, can be deemed an anomaly.

As will be appreciated, FIG. 3 depicts a very small, and thus simple, bipartite graph for ease of illustration. In practice, when representing network access events in a bipartite graph in accordance herewith, the number of nodes and edges will generally be much larger, and the network structure much more complex. Graph embedding techniques allow condensing much of the rich information inherent in the graph structure into low-dimensional representations (the graph embeddings) that are computationally tractable, yet meaningful.

Figure 4:
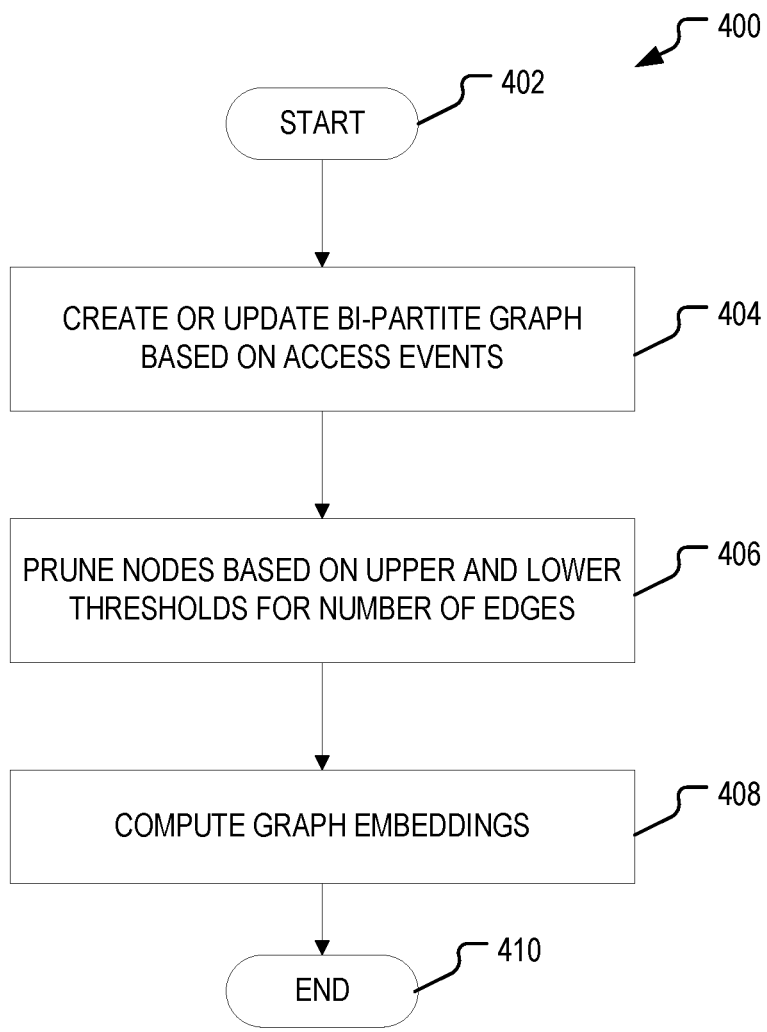
FIG. 4 is a flow chart of an example method of determining graph embeddings for resources and accessing nodes, in accordance with an embodiment.

FIG. 4 is a flow chart of an example method 400 of determining graph embeddings for resources and accessing nodes, illustrating the training stage in more detail for an individual iteration associated with a bipartite graph and graph embeddings for a given point in time. Depending on whether a bipartite graph already exists at the start (402) of the method 400, the method 400 involves either creating a bipartite graph from scratch, or updating an already existing bipartite graph, based on the access events. Generating the graph involves creating edges to indicate for each pair of an accessing node and a resource node whether the accessing node has accessed the resource node at any time up to the current point in time, or within a finite time window of specified length preceding the current point in time, depending on the particular embodiment. The edges may be binary or weighted. In the latter case, edge weights may be determined, e.g., as functions of the number of access events between the pair of nodes that the edge connects. In the case of an update to an already existing graph with binary edges, only access events since the most recent update need be considered when creating new edges. However, if the time-based bipartite graph is to reflect only access events within a certain time window preceding the current point in time, an additional check may be used to identify any edges that are based on access events that all precede the time window, and these "expired" edges are removed from the graph. Alternatively, the updated bipartite graph can be created from scratch based on the access events that fall within the time window. Creating the graph and edges can, in practice, take the form of populating a bi-adjacency matrix whose rows correspond to the accessing nodes and whose columns correspond to the resource nodes, or vice versa.

Following assignment of edges to pairs of nodes, the graph may, optionally, be pruned by removing nodes connected to a number of nodes of the other type that is in excess of a specified upper threshold number or below a specified lower threshold number (act 406). For example, resource nodes that have been accessed by more than a pre-defined number (e.g., 5000) of users (or other accessing nodes) are likely commonly referenced and unlikely to contain sensitive information, and may therefore be deemed public for all practical purposes, obviating any need for further monitoring them. Resource nodes connected to fewer than a lower threshold number of users (or other accessing nodes) may be removed for the sake of avoiding false positives that are otherwise likely to be raised whenever a new user accesses the resource.

Once the graph has been updated and/or pruned, a bipartite graph embedding algorithm is performed to learn low-dimensional vector representations, called embeddings, of the accessing nodes, the resource nodes, or both in a common vector space (act 408). Suitable graph embedding algorithms are known to those of ordinary skill in the art (for an example graph embedding algorithm, see Rohe, K., Qin, T., and Yu, B. (2016). "Co-clustering directed graphs to discover asymmetries and directional communities. *Proceedings of the National Academy of Sciences*, 12679-12684). Following computation of the graph embeddings, the method 400 ends (at 410). The distance between the embeddings of any two accessing nodes or any two resource nodes, as computed with a distance function or metric as the terms are commonly understood in mathematics, represents a measure of dissimilarity between them. Distances between the graph embeddings computed in the training stage are determined and used subsequently in the scoring stage.

FIG. 5 is a flow chart of an example method 500 of detecting anomalies in network accesses based on graph embeddings of resource and accessing nodes, illustrating the scoring stage for a given access event of interest. Broadly speaking, the storing stage involves computing an anomaly score that aims to quantify the level of surprise at the particular access event, such as, from the perspective of the accessed resource node, the surprise at receiving an access request from the accessing node (e.g., user) in question. For a user (or other accessing node) u accessing a resource r, consider the set $\mathcal{U}_r$ of the embeddings of the users who have accessed resource r in the pre-defined time window (which may be finite or extend all the way to the beginning of monitoring access events). Upon start of the method 500 (at 502), the first step in determining the anomaly score is to compute the pairwise dissimilarities between user u and each of the users who have accessed resource r in the pre-defined time window in terms of their embedding distances (in act 504). Any metric operating on vectors can generally be used for this purpose; example metrics include the Euclidian distance and the cosine distance.

The anomaly score for the access event is determined from the pairwise embedding distances between user u and each of the users who have previously accessed the same resource r (in act 506). In some embodiments, the anomaly score is taken to be the minimum of these distances, that is, the distance between the embeddings of user u and its nearest neighbor in $\mathcal{U}_r$. In other embodiments, the anomaly score is the distance between the embeddings of user u and its second-nearest neighbor. The anomaly score may also be computed as some combination of the individual distances of the user embeddings within $\mathcal{U}_r$ from the embedding of user u. For example, the Mahalanobis distance may be used to measure the distance between the embedding of user u and the mean of the user embeddings within $\mathcal{U}_r$, e.g., normalized by the standard deviation of the distribution of user embeddings in $\mathcal{U}_r$ around the mean.

In some embodiments, the roles of the accessing nodes (e.g., users) and resources are exchanged, so that the level of surprise at an access is evaluated from the perspective of the user rather than the resource. In that case, the pairwise embedding distances between the resource r in question and the set of other resources previously accessed by the user u are computed (in 504), and the anomaly score is determined based on these distances (in 506). Both perspectives may also be combined to produce a single, stronger score. For example, partial anomaly scores computed separately based on distances between user embeddings and distances between resource embeddings may be averaged, optionally in a weighted manner, to form the overall anomaly score.

To make a decision whether the access event is anomalous, the computed anomaly score is compared against a pre-defined anomaly threshold (at 508), and access events with an anomaly score greater than the threshold are flagged as anomalous (in 510), which concludes the method 500 (at 512). If the anomaly score represents the nearest-neighbor distance, setting the threshold at zero is equivalent to flagging all access events for which the user has not previously used the resource. Using, e.g., the second-nearest-neighbor distance provides some robustness of the anomaly detection method to previous anomalous events.

To describe anomaly detection based on graph embeddings of accessing nodes and/or resources nodes more formally, consider a dynamic bipartite graph with m accessing nodes (e.g., users) $V_u$, n resource nodes $V_r$, and time-stamped edges $E \subset V_u \times V_r \times \mathbb{R}$. Here, an edge (u, r, t) $\in$E represents an access event involving accessing node u accessing (or attempting to access) resource r at time t. For a time t$\in\mathbb{R}$, let $A^{(t)} \in \{0,1\}^{m \times n}$ denote the bi-adjacency matrix of a snapshot of the graph up to time t, where $A_{ur}^{(t)}=1$ if (u, r, s)$\in$E for any s<t (or, if only prior access attempts within a finite time window $\Delta t$ are considered, for any t-$\Delta t$<s<t), and $A_{ur}^{(t)}=0$ otherwise. Considering, for specificity, the case of anomaly scoring based on dissimilarity between u and other accessing nodes that have previously accessed r, the general framework for scoring a new edge (u, r, t) is as follows:

1) Graph embedding. Using $A^{(t)}$, compute d-dimensional graph embeddings of the accessing nodes, $X_1^{(t)}, \ldots, X_m^{(t)} \in \mathbb{R}^d$.
2) Anomaly detection. Let $\chi_r^{(t)}=\{X_v^{(t)}:(v, r, s), s<t\}$ denote the set of accessing node embeddings for users who have accessed resource r before time t. Return the anomaly score $s_{(u,r,s)}$, such as the distance from $X_u^{(t)}$ to its nearest neighbor in $\chi_r^{(t)}$. In practice, the embedding remains relatively stable over time, so it need not be recomputed for each new edge. Instead, embeddings may be recomputed at regular intervals, such as daily or weekly, to capture any aggregated updates to the graph within the intervening time period. In the following, the superscript (t) will be dropped for simplicity.

In one embodiment, the graph embeddings are computed as spectral embeddings using the regularized bi-Laplacian matrix, and subsequently projected. The regularized bi-Laplacian matrix $L_r$ with regularization parameter $\tau \in \mathbb{R}_+$ is defined as:

$$L_r=(D^{(u)}+\tau I_m)^{-1/2}A(D^{(r)}+\tau I_n)^{-1/2},$$

where $D^{(u)}$ and $D^{(r)}$ are the diagonal user (or accessing-node) and resource degree matrices with $D_{u,u}^{(1)}=\Sigma_r A_{ur}$ and $D_{r,r}=\Sigma_u A_{ur}$, and $I_n$ is the n×n identity matrix. Given the regularized bi-Laplacian matrix and the embedding dimension d, the embedding algorithm is as follows:

1) Denote the rank-d singular value decomposition of $L_\tau$ as $USV^T$ and let $$X^*=[X_1^*, \ldots, X_m^*]^T=US^{1/2}\in\mathbb{R}^{m \times d},$$

$$Y^*=[Y_1^*, \ldots, Y_n^*]^T=VS^{1/2}\in\mathbb{R}^{n \times d}.$$

2) Define $X_u=X_u^*/\|X_u^*\|$ and $Y_r=Y_r^*/\|Y_r^*\|$ as the projection of $X_u^*$ and $Y_r^*$ onto the unit sphere, respectively.

The vectors $X_1, \ldots, X_m \in \mathbb{R}^d$ are embeddings of the accessing nodes, and the vectors $Y_1, \ldots, Y_n \in \mathbb{R}^d$ are embeddings of the resources. In the approach outlined above, only the accessing-node embeddings are used. However, as previously indicated, it is also possible to use, instead, only the resource embeddings, or both accessing-node and resource embeddings for a combined anomaly score.

The embedding dimension (or "dimensionality") d is a hyper-parameter, which may be chosen to balance the conflicting goals of keeping computational cost low while retaining enough of the complexity and richness of the graph data for the embeddings to be useful in anomaly detection. Both computational cost and the amount of information captured in the embeddings increase with the embedding dimension d, but the added benefit of further increasing d tends to diminish at a certain point. In some embodiments, this point is determined (in an approximate manner) based on examination of a plot of the singular values of the graph bi-adjacency matrix, known as a scree plot.

Figure 6:
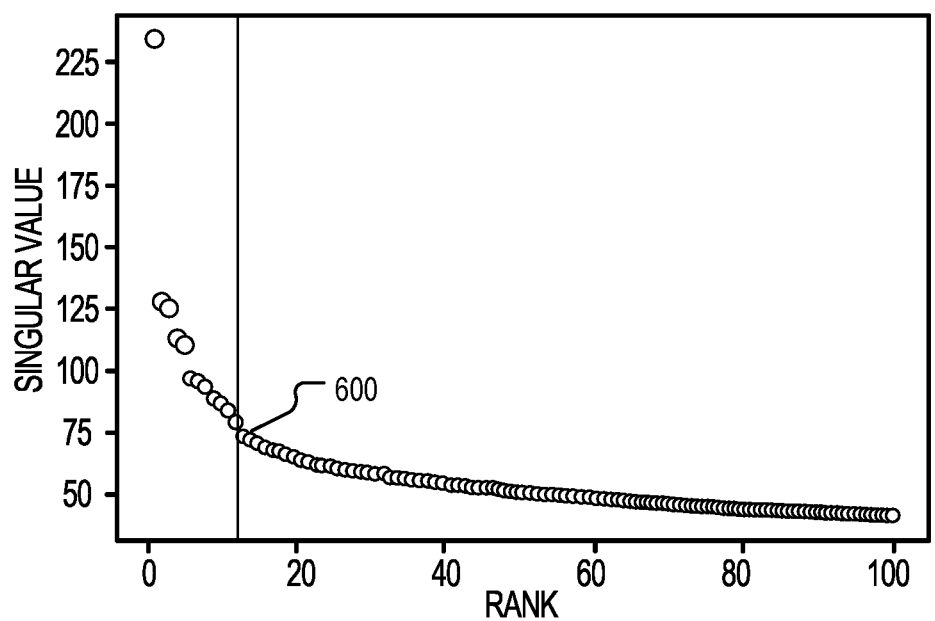
FIG. 6 is an example scree plot of singular values as may be used in selecting an embedding dimension for the graph embeddings, in accordance with an embodiment.

FIG. 6 is an example scree plot of singular values as may be used in selecting an embedding dimension for the graph embeddings, in accordance with an embodiment. As shown, in a scree plot, the singular values are provided along the ordinate as a function of rank (the position in an ordered listed of the singular values) plotted along the abscissa. The singular values up to a certain rank can serve as a proxy for the richness of the information retained in graph embeddings of a dimension equal to that rank. Therefore, the point of diminishing returns from increasing the dimension d can be found by identification of an "elbow" 600 in the scree plot where the singular values level off. The elbow identification can be done by eye or using an automated method such as the profile likelihood method.

The regularization parameter may be set to the average in-degree. Regularization improves the performance of spectral embeddings by delocalizing the principle singular vectors which otherwise tend to localize on low-degree nodes. The second stage of the algorithm performs degree correction—that is, it removes the dependence of a node's degree from its position in the embedding space. This is important in the instant application, where the types of users that tend to access a resource are of interest, not the number of people.

In one embodiment, the edges (u, r, t) are scored using simple nearest-neighbor anomaly detection. Let $\chi_r=\{X_v(v, r, s), s<t\}$ denote the set of embeddings for accessing nodes who have accessed resource r before time t. The anomaly score for an edge is given by the distance from $X_u$ to its nearest neighbor in $\chi_r$. If an accessing node u has previously accessed a resource r (before time t), the edge (u, r, t) will receive an anomaly score $s_{(u,r,s)}=0$, since $X_u \in \chi_r$. Otherwise, $s_{(u,r,s)}>0$. An edge may be flagged as anomalous if its anomaly score is greater than a pre-defined anomaly threshold $\alpha \in \mathbb{R}$. Setting $\alpha=0$ is equivalent to flagging an edge whenever a user accesses a resource for the first time.

The disclosed approach to monitoring network accesses for anomalies based on bipartite graph embeddings provides multiple benefits. Deriving representations of the accessing nodes (like users) and resources directly from the structure of the bipartite graph inherently captures and takes advantage of the information about access patterns that the graphs contains, and obviates the need for hand-designed representations. Further, the use of graph embeddings to represent the nodes allows condensing the rich graph information in a manner that retains enough of its complexity in the multi-dimensional representations while at the same reducing the dimensionality of the problem significantly for computational tractability. For example, in a typical security application, the bipartite graph of access events may include thousands, tens of thousands, or hundreds of thousands of nodes of each type, whereas typical useful graph embedding dimensions may be on the order of ten, which very efficiently compresses the relevant information within the (usually sparse) bipartite graph. The embedding dimension may, further, be tuned (e.g., based on a scree plot as described above) to optimize the tradeoff between low computational cost and relevant information content. With these benefits and characteristics, the disclosed approach renders continuously monitoring large networks for anomalies feasible and scalable, complementing other means of discovering security threats.

Figure 7:
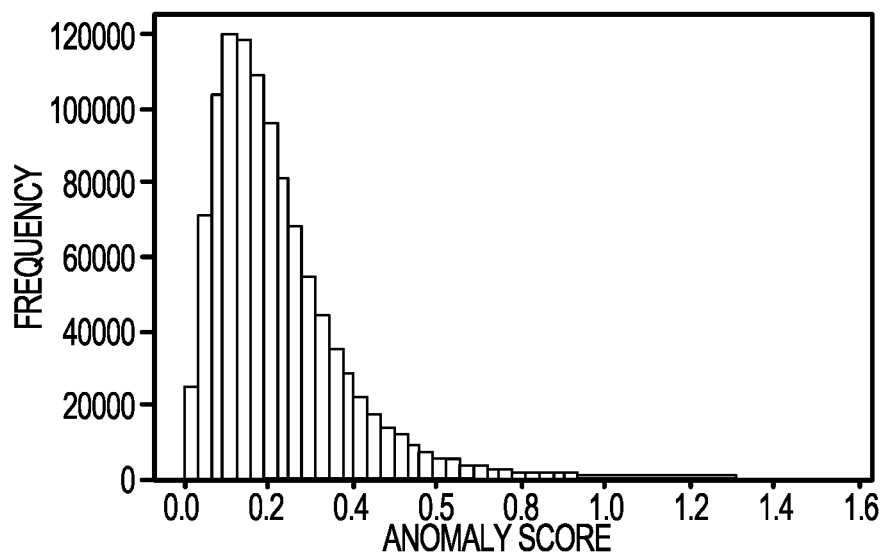
FIG. 7 is a graph showing an example distribution of non-zero anomaly scores computed based on graph embeddings, in accordance with an embodiment.
Figure 8:
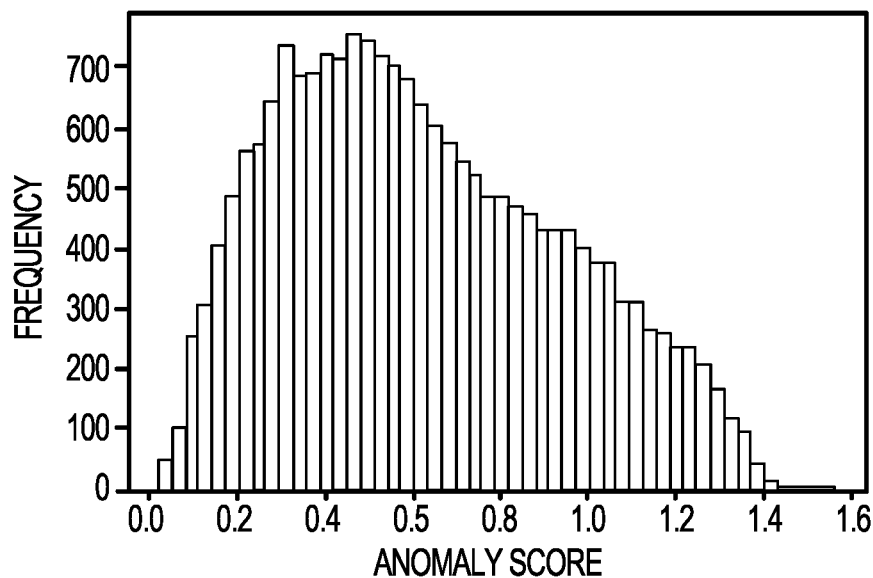
FIG. 8 is a graph showing an example distribution of anomaly scores computed based on graph embeddings, in accordance with an embodiment, for accesses flagged as anomalous by an independent anomaly detection method.

To illustrate the anomaly detection potential of the above-described anomaly-detection method with an example, FIGS. 6-8 provide data associated with its application to a set of 29,279 Sharepoint sites accessed by a total of 42,643 users (each site accessed by between 5 and 5000 of the users) of an organization. An edge represents an interaction between a user and a Sharepoint site. In the training stage, a bipartite graph and its associated bi-adjacency matrix were generated based on 28 days of logs. FIG. 6 shows the scree plot of the top one hundred ordered singular values of the bi-adjacency matrix for this period. An embedding dimension d=12 was chosen based on the elbow 600 in the scree plot. Following initial training, user-site interactions during the subsequent 28 days were scored using the described approach, and embeddings were updated daily. A total of 5,936,732 edges were scored. Of these, 81.9% received a score of zero, indicating that the edge had occurred previously. FIG. 7 is a graph showing the distribution of the non-zero anomaly scores computed based on graph embeddings.

For comparison, two alternative anomaly detection methods were applied to the same data: (1) In a "naïve" approach, an anomaly was raised whenever a user accessed a resource that he had not previously accessed. (2) In an "organizational," at a specified level of the organizational hierarchy, an anomaly was raised whenever a user accessed a site which no other member of his respective user group had previously visited. The first alternative approach is equivalent to the graph-based anomaly detection with a detection threshold set to zero, and produces a large amount of anomalies. The second approach uses a notion of similarity between users, but rather than being learned from data, similarity is determined based simply on whether two users belong to the same organization. This approach raised 20,018 anomalies, a similar amount to the graph-based approach when a threshold of 0.75 is applied.

FIG. 8 shows the distribution of the anomaly scores computed with the graph-based approach for the edges flagged based on organizational anomaly detection. As can be seen, anomalies raised by the organizational approach tend to be assigned high anomaly scores using graph-based anomaly detection. An advantage of anomaly detection via graph embeddings compared with a pure organizational approach is that, if users regularly behave as if they belong to a different organization (e.g., because they work on an inter-organizational project), the former approach can learn this behavior, while the latter approach, which is based on fixed metadata, cannot.

The anomaly detection approach described herein can be implemented with a combination of computing hardware and software, e.g., with software executing on a general-purpose computer, or with a combination of special-purpose processors (such as hardware accelerators adapted for certain computational operations) and software executed on general-purpose processors.

Figure 9:
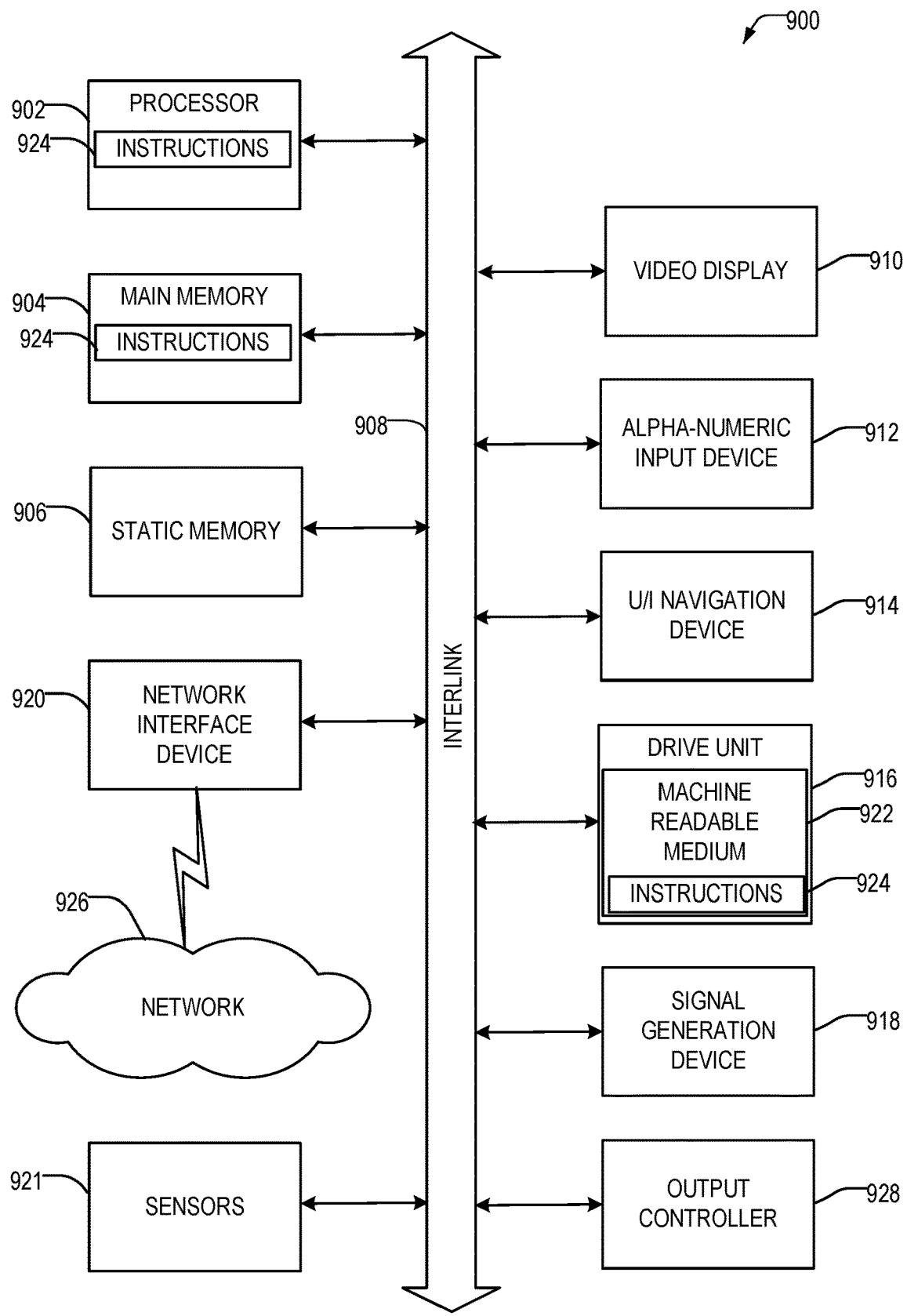
FIG. 9 is a block diagram of an example computing machine as may be used in implementing access event monitoring and anomaly detection in accordance with an embodiment.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. In some embodiments, machine-readable media include transitory propagating signals. In some embodiments, machine-readable media include non-transitory machine-readable media, such as data storage devices. Non-limiting machine-readable medium examples include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media are non-transitory machine-readable media.

The instructions 924 may further be transmitted or received over a communications network 926 using a transmission medium via the network interface device 920. The machine 900 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

The following numbered examples are illustrative embodiments.

Example 1 is a method for monitoring accesses to resource nodes in a computer network for anomalies. The method includes monitoring the computer network for access events each involving an access or attempted access by one of a plurality of accessing nodes to one of a plurality of resource nodes, and storing time-stamped records of the access events. The method further involves creating and maintaining, based on the stored records, a time-dependent bipartite graph that represents the plurality of accessing nodes and the plurality of resource nodes as two distinct sets of nodes and the access events as edges between the nodes, and computing time-dependent multi-dimensional graph embeddings of the plurality of accessing nodes or the plurality of resource nodes from the time-dependent bipartite graph. An anomaly score for a current access event is computed based on distances of graph embeddings of an accessing node associated with the current access event from graph embeddings of accessing nodes that previously accessed a resource node associated with the current access event, and/or distances of a graph embedding of the resource node associated with the current access event from graph embeddings of resource nodes previously accessed by the accessing node associated with the current access event. The method includes determining, based on comparison of the anomaly score against a specified anomaly threshold, that the current access event is anomalous, and responsive to that determination, causing one or more mitigating actions.

Example 2 is the method of example 1, further including performing the one or more mitigating actions.

Example 3 is the method of example 1 or example 2, wherein the one or more mitigating actions include one or more of the following: presenting a logon challenge to the accessing node associated with the current access event prior to granting access to the associated resource node; denying the associated accessing node access to the associated resource node; revoking access credentials of the associated accessing node; or notifying a security administrator of the current access event.

Example 4 is the method of any of examples 1-3, wherein maintaining the time-dependent bipartite graph comprises periodically updating the time-dependent bipartite graph based on access events since a most recent prior update, and wherein computing the time-dependent multi-dimensional graph embeddings comprises periodically recomputing the time-dependent multi-dimensional graph embeddings based on the updated time-dependent bipartite graph.

Example 5 is the method of any of examples 1-3, wherein maintaining the time-dependent bipartite graph comprises updating the time-dependent bipartite graph responsive to an update trigger event based on access events since a most recent prior update, and wherein computing the time-dependent multi-dimensional graph embeddings comprises recomputing the time-dependent multi-dimensional graph embeddings based on the updated time-dependent bipartite graph.

Example 6 is the method of any of examples 1-3, wherein maintaining the time-dependent bipartite graph comprises continuously updating the time-dependent bipartite graph responsive to monitored access events, and wherein computing the time-dependent multi-dimensional graph embeddings comprises recomputing the time-dependent multi-dimensional graph embeddings responsive to updates of the time-dependent bipartite graph.

Example 7 is the method of any of examples 1-6, wherein, in the time-dependent bipartite graph, for each pair of an accessing node and a resource node, the two nodes are connected by an edge if and only if the accessing node has accessed the resource node at some point in time up to a most recent update time associated with the time-dependent bipartite graph.

Example 8 is the method of any of examples 1-6, wherein, in the time-dependent bipartite graph, for each pair of an accessing node and a resource node, the two nodes are connected by an edge if and only if the accessing node has accessed the resource node within a specified time window preceding a most recent update time associated with the time-dependent bipartite graph.

Example 9 is the method of any of examples 1-8, wherein maintaining the time-dependent bipartite graph comprises removing resource nodes having a number of associated edges that are in excess of a specified upper threshold number of accessing nodes or below a specified lower threshold number of accessing nodes.

Example 10 is the method of any of examples 1-9, wherein the dimensionality of the time-dependent multi-dimensional graph embeddings is selected based on a scree plot of singular values associated with the time-dependent bipartite graph.

Example 11 is the method of any of examples 1-10, wherein the anomaly score for the current access event corresponds to a smallest distance among the distances between the graph embeddings.

Example 12 is the method of any of examples 1-10, wherein the anomaly score for the current access event corresponds to a Mahalanobis distance computed from the graph embeddings.

Example 13 is a system for monitoring accesses to resource nodes in a computer network for anomalies. The system includes one or more computer processors, and one or more computer-readable media storing instructions which, when executed by the one or more computer processors, cause the one or more computer processors to perform the operations of any of examples 1-12.

Example 14 is a non-transitory computer-readable medium, or multiple non-transitory computer-readable media, storing instructions which, when executed by one or more computer processors, cause the one or more computer processors to perform operations of any of examples 1-12.

Although the disclosed subject matter has been described with reference to specific embodiments, it will be evident that various modifications and changes may be made to these embodiments without departing from the broader scope of the invention. Accordingly, the specification and drawings are to be regarded in an illustrative rather than a restrictive sense.

What is claimed is:

1. A method for monitoring accesses to resource nodes in a computer network for anomalies, the method comprising:
    monitoring the computer network for access events each involving an access or attempted access by one of a plurality of accessing nodes to one of a plurality of resource nodes;
    storing time-stamped records of the access events;
    creating and maintaining, based on the stored records, a time-dependent bipartite graph that represents the plurality of accessing nodes and the plurality of resource nodes as two distinct sets of nodes and the access events as edges between the nodes;
    computing time-dependent multi-dimensional graph embeddings of at least one of the plurality of accessing nodes or the plurality of resource nodes from the time-dependent bipartite graph;
    computing an anomaly score for a current access event based on at least one of:
        distances of graph embeddings of an accessing node associated with the current access event from graph embeddings of accessing nodes that previously accessed a resource node associated with the current access event, or
        distances of a graph embedding of the resource node associated with the current access event from graph embeddings of resource nodes previously accessed by the accessing node associated with the current access event;
    determining, based on comparison of the anomaly score against a specified anomaly threshold, that the current access event is anomalous; and
    responsive to determining that the current access event is anomalous, causing at least one mitigating action.

2. The method of claim 1, further comprising performing the at least one mitigating action.

3. The method of claim 1, wherein the at least one mitigating action comprises at least one of:
    presenting a logon challenge to the associated accessing node prior to granting access to the associated resource node;
    denying the associated accessing node access to the associated resource node;
    revoking access credentials of the associated accessing node; or
    notifying a security administrator of the current access event.

4. The method of claim 1, wherein maintaining the time-dependent bipartite graph comprises periodically updating the time-dependent bipartite graph based on access events since a most recent prior update, and wherein computing the time-dependent multi-dimensional graph embeddings comprises periodically recomputing the time-dependent multi-dimensional graph embeddings based on the updated time-dependent bipartite graph.

5. The method of claim 1, wherein maintaining the time-dependent bipartite graph comprises updating the time-dependent bipartite graph responsive to an update trigger event based on access events since a most recent prior update, and wherein computing the time-dependent multi-dimensional graph embeddings comprises recomputing the time-dependent multi-dimensional graph embeddings based on the updated time-dependent bipartite graph.

6. The method of claim 1, wherein maintaining the time-dependent bipartite graph comprises continuously updating the time-dependent bipartite graph responsive to monitored access events, and wherein computing the time-dependent multi-dimensional graph embeddings comprises recomputing the time-dependent multi-dimensional graph embeddings responsive to updates of the time-dependent bipartite graph.

7. The method of claim 1, wherein, in the time-dependent bipartite graph, each pair of an accessing node and a resource node are connected by an edge if and only if the accessing node has accessed the resource node at some point in time up to a most recent update time associated with the time-dependent bipartite graph.

8. The method of claim 1, wherein, in the time-dependent bipartite graph, each pair of an accessing node and a resource node are connected by an edge if and only if the accessing node has accessed the resource node within a specified time window preceding a most recent update time associated with the time-dependent bipartite graph.

9. The method of claim 1, wherein maintaining the time-dependent bipartite graph comprises removing resource nodes having a number of associated edges that are in excess of a specified upper threshold number of accessing nodes or below a specified lower threshold number of accessing nodes.

10. The method of claim 1, wherein a dimensionality of the time-dependent multi-dimensional graph embeddings is selected based on a scree plot of singular values associated with the time-dependent bipartite graph.

11. The method of claim 1, wherein the anomaly score for the current access event corresponds to a smallest distance among the distances between the graph embeddings.

12. The method of claim 1, wherein the anomaly score for the current access event corresponds to a Mahalanobis distance computed from the graph embeddings.

13. A system for monitoring accesses to resource nodes in a computer network for anomalies, the system comprising:
 one or more computer processors; and
 one or more computer-readable media storing instructions which, when executed by the one or more computer processors, cause the one or more computer processors to perform operations comprising:
  monitoring the computer network for access events each involving an access or attempted access by one of a plurality of accessing nodes to one of a plurality of resource nodes;
  storing time-stamped records of the access events;
  creating and maintaining, based on the stored records, a time-dependent bipartite graph that represents the plurality of accessing nodes and the plurality of resource nodes as two distinct sets of nodes and the access events as edges between the nodes;
  computing time-dependent multi-dimensional graph embeddings of at least one of the plurality of accessing nodes or the plurality of resource nodes from the time-dependent bipartite graph;
  computing an anomaly score for a current access event based on at least one of:
   distances of graph embeddings of an accessing node associated with the current access event from graph embeddings of accessing nodes that previously accessed a resource node associated with the current access event, or
   distances of a graph embedding of the resource node associated with the current access event from graph embeddings of resource nodes previously accessed by the accessing node associated with the current access event;
  determining, based on comparison of the anomaly score against a specified anomaly threshold, that the current access event is anomalous; and
  responsive to determining that the current access event is anomalous, causing at least one mitigating action.

14. The system of claim 13, wherein the operations further comprise performing the at least one mitigating action.

15. The system of claim 13, wherein the at least one mitigating action comprises at least one of:
 presenting a logon challenge to the associated accessing node prior to granting access to the associated resource node;
 denying the associated accessing node access to the associated resource node;
 revoking access credentials of the associated accessing node; or
 notifying a security administrator of the current access event.

16. The system of claim 13, wherein maintaining the time-dependent bipartite graph comprises periodically updating the time-dependent bipartite graph based on access events since a most recent prior update, and wherein computing the time-dependent multi-dimensional graph embeddings comprises periodically recomputing the time-dependent multi-dimensional graph embeddings based on the updated time-dependent bipartite graph.

17. The system of claim 13, wherein maintaining the time-dependent bipartite graph comprises removing resource nodes having a number of associated edges that are in excess of a specified upper threshold number of accessing nodes or below a specified lower threshold number of accessing nodes.

18. The system of claim 13, wherein a dimensionality of the time-dependent multi-dimensional graph embeddings is selected based on a scree plot of singular values associated with the time-dependent bipartite graph.

19. The system of claim 13, wherein the anomaly score for the current access event corresponds to a smallest distance among the distances between the graph embeddings.

20. One or more non-transitory computer-readable media storing instructions which, when executed by one or more computer processors, cause the one or more computer processors to perform operations comprising:
 monitoring the computer network for access events each involving an access or attempted access by one of a plurality of accessing nodes to one of a plurality of resource nodes;
 storing time-stamped records of the access events;
 creating and maintaining, based on the stored records, a time-dependent bipartite graph that represents the plurality of accessing nodes and the plurality of resource nodes as two distinct sets of nodes and the access events as edges between the nodes;
 computing time-dependent multi-dimensional graph embeddings of at least one of the plurality of accessing nodes or the plurality of resource nodes from the time-dependent bipartite graph;
 computing an anomaly score for a current access event based on at least one of:
  distances of graph embeddings of an accessing node associated with the current access event from graph embeddings of accessing nodes that previously accessed a resource node associated with the current access event, or
  distances of a graph embedding of the resource node associated with the current access event from graph embeddings of resource nodes previously accessed by the accessing node associated with the current access event;
 determining, based on comparison of the anomaly score against a specified anomaly threshold, that the current access event is anomalous; and
 responsive to determining that the current access event is anomalous, causing at least one mitigating action.

* * * * *